(12) United States Patent
Rebsdorf

(10) Patent No.: US 8,664,791 B2
(45) Date of Patent: Mar. 4, 2014

(54) FLEXIBLE SHAFT WIND TURBINE

(75) Inventor: Anders Varming Rebsdorf, Skanderborg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 324 days.

(21) Appl. No.: 13/164,917

(22) Filed: Jun. 21, 2011

(65) Prior Publication Data

US 2011/0309631 A1 Dec. 22, 2011

(30) Foreign Application Priority Data

Jun. 21, 2010 (DK) ................................. 2010 70280

(51) Int. Cl.
*F03D 9/00* (2006.01)
*H02P 9/04* (2006.01)

(52) U.S. Cl.
USPC .......................................................... 290/55

(58) Field of Classification Search
USPC ................................................... 290/44, 55
See application file for complete search history.

(56) References Cited

U.S. PATENT DOCUMENTS

| | | |
|---|---|---|
| 4,335,587 A | 6/1982 | Thomamueller et al. |
| 4,757,211 A | 7/1988 | Kristensen |
| 6,619,918 B1 * | 9/2003 | Rebsdorf ........................... 416/1 |
| 8,398,369 B2 * | 3/2013 | Rebsdorf et al. ................. 416/43 |
| 2011/0309632 A1 * | 12/2011 | Rebsdorf ......................... 290/55 |

FOREIGN PATENT DOCUMENTS

| | | |
|---|---|---|
| CN | 1563698 A | 1/2005 |
| CN | 201177015 Y | 1/2009 |
| CN | 201221653 Y | 4/2009 |
| CN | 101473102 A | 7/2009 |
| WO | 03/037608 A1 | 5/2003 |

* cited by examiner

*Primary Examiner* — Javaid Nasri
(74) *Attorney, Agent, or Firm* — Roberts Mlotkowski Safran & Cole, P.C.; David S. Safran

(57) ABSTRACT

A horizontal-axis wind turbine of a rotor-support design is provided in which the structural load of the wind turbine rotor is carried by the wind turbine tower itself. The turbine uses a composite shaft to transfer torque from the wind turbine rotor to the generator, the shaft having high torsional strength but being flexible in bending. This prevents the transmission of bending moments from the rotor hub to the generator system. Accordingly, the components of the turbine can be rigidly mounted to the turbine main frame, removing the need for vibration damping elements. The result is a wind turbine of reduced weight, which can be modeled and designed for improved efficiency and performance. Furthermore, as the turbine components do not have to be load-balanced, the turbine can be of a modular construction for relatively easy servicing and/or upgrading.

16 Claims, 2 Drawing Sheets

FLEXIBLE SHAFT WIND TURBINE

BACKGROUND OF THE INVENTION

1. Field of the Invention

The present invention relates to a wind turbine, in particular to a wind turbine having the wind turbine hub supported directly by the main frame, such that the transmission of torque from the hub to the generator is separated from the support of the rotor.

2. Description of Related Art

Rotor support-type wind turbines are a known alternative wind turbine design, wherein the structural load of the hub and rotor blades is provided by a fixed support shaft provided on the wind turbine main frame. As the hub is allowed to rotate freely about the support shaft, consequentially the structural load is transferred to the main frame while the torque provided by the spinning rotor blades is transferred to the generation system.

U.S. Pat. No. 4,757,211 discloses a rotor support-type wind turbine wherein a rotor hub is mounted onto a cylindrical section of the machine housing, the structural load of the rotor hub being supported by the machine housing. A hub shaft extends from the hub to the gearbox, and is accordingly coupled to the generator.

One of the disadvantages of such a system is that in order to compensate for vibrations and bending moments transferred through the hub shaft from the hub, the generator and the gearbox must be mounted on vibration damping elements which are coupled to the machine housing. Furthermore, the hub is mounted to the machine housing utilising flexible bushings and further damping elements. Damping elements can also used in such constructions to compensate for misalignments between turbine components, e.g., in the case of the hub shaft and the gearbox not being perfectly aligned.

Such damping elements are subject to wear and tear during the lifetime of the system, often requiring replacement every 3-5 years in a relatively costly maintenance operation, at which time the turbine must be taken out of service for an extended period of time.

Additionally, the presence of dampers in the turbine system introduces a variable element to turbine modelling, in that it can be hard to predict where the most stresses on the other turbine components will occur, due to the unpredictability of the performance of the damper elements.

SUMMARY OF THE INVENTION

It is an object of the invention to provide a wind turbine design having improved reliability, ease of servicing, and is easier to model at the initial design stage.

Accordingly, there is provided a horizontal-axis wind turbine having a rotor with a diameter of at least 50 m length, the turbine comprising:

a wind turbine main frame;

a generator system, at least a portion of which is rigidly mounted to the main frame;

a rotor hub, the hub mounted to a rigid support shaft provided on the main frame, wherein the hub is operable to rotate about the support shaft and wherein the support shaft transfers the structural load of the hub to the main frame, and a drive shaft rigidly connected to and extending from the hub, wherein the drive shaft is connected to the generator system to transfer torque from the hub to the generator system, and wherein the drive shaft is a mechanically anisotropic shaft adapted to limit the bending moments transferred between the hub and the generator system.

Such a construction allows for the structural load of the rotor to be carried by the turbine main frame. As the drive shaft is anisotropic, this means it has different mechanical properties in different directions—the shaft is flexible with regard to bending moments, and high in torsional strength. Accordingly, the drive shaft is able to transfer torque from the rotor hub to the generator, but is able to deflect to prevent the transmission of bending moments from the hub to the generator, i.e., the shaft is operable to absorb the bending moments from the rotor hub. As a result, a portion or all of the generator system can be rigidly mounted to the main frame of the wind turbine, removing the need for damping elements to protect the generator system.

Preferably, the drive shaft is rigidly connected to the generator system.

It will be understood that the use of the term "rigidly mounted" means that components are fixed without the use of damping elements, i.e., the components are not flexibly mounted in the wind turbine structure, e.g., without the use of rubber mounts, dampers, torque arms, etc.

It will be understood that the use of the term "rigidly connected" means that components are directly connected or mounted together, e.g., without damping elements and/or without relative motion between the connected components.

As the shaft used is flexible to absorb the transmission of vibrations between the rotor and the generator system, such rigid mounting and connecting of components can be accomplished, eliminating the need for vibration damping elements in the wind turbine construction.

Preferably, the entire generator system is rigidly mounted to the main frame of the wind turbine, eliminating the need for any vibration damping elements in the system.

Preferably, the drive shaft is a composite material shaft.

Preferably, the drive shaft is selected from one of the following: a filament wound shaft, a pre-preg fiber composite shaft, a slatted-construction shaft. Fibers in such a shaft can be chosen among several types of fibers e.g., glass, carbon, basalt, aramid, organic fibers.

Preferably, the generator system comprises a gearbox coupled to a generator, the gearbox rigidly mounted to the main frame, wherein the drive shaft is directly connected to the gearbox to drive the generator.

The generator may also be rigidly mounted to the main frame in this construction.

Alternatively, the generator system comprises a generator rigidly mounted to the main frame, and wherein the drive shaft is directly connected to the generator.

As the components can be rigidly mounted to the main frame, there is no need to use vibration damping elements for the components of the generator system. As damping elements are not used, damper failure ceases to be an issue for the design of the turbine. Accordingly, loads experienced by the turbine components can be more easily predicted and modelled, with the result that turbine structure can be optimised at the design stage.

Preferably, the rigid support shaft is provided at a first end of the main frame, and wherein the generator system is releasably mounted to a second opposed end of the main frame.

Preferably, the generator system is releasably mounted to an exterior surface of the main frame.

As the drive shaft is flexible enough to prevent transmission of bending moments from the hub to the generator system, the components do not have to be load-wise mounted within the turbine. Accordingly, as the components of the turbine are releasably mounted to the main frame, this provides for modular construction of the turbine as well as relatively easy servicing of installed turbines—components can be easily removed and replaced without complicated mounting/de-mounting operations. It will be understood that this releasable mounting may be rigidly mounted, i.e., without the use of damping elements.

Preferably, the rigid support shaft is releasably mounted to a first end of the main frame.

Preferably, the wind turbine comprises at least two sets of hub bearings provided at the support shaft, the hub mounted to the sets of hub bearings.

Preferably, the drive shaft is directly connected between the hub and the generator system.

As the drive shaft extends from the hub, with the structural load of the rotor hub carried by the rigid support shaft and the main frame, there is no need for any support of the drive shaft in the turbine.

Preferably, the drive shaft is a hollow shaft.

Preferably, the wall thickness of the drive shaft is chosen to be any suitable dimension between 10 mm-400 mm.

Preferably, the drive shaft comprises a nanocomposite material. This may include nano clay, carbon nano tubes, nano silica.

Preferably, the drive shaft is made from an electrically insulating material. This prevents the transmission of current in the event of a lightening strike, which may damage wind turbine components.

Preferably, the drive shaft is at least 3 m in length. Further preferably, the drive shaft is at least 7 meters in length. Preferably, the drive shaft comprises an outer diameter of at least 1 meter.

Preferably, the turbine has a maximum power rating of at least 2 MW.

Preferably, the shaft comprises a fiber composite main shaft body and at least one coupling flange formed from a rigid material suitable for bolting, the at least one coupling flange arranged to couple with at least one end of the main shaft body.

As the coupling flange may be formed from a material different to the fiber-based material of the main shaft body, this means that a more secure bolting connection can be established between the drive shaft and the other wind turbine components. Preferably the coupling flange is formed from a metallic material, e.g., steel.

Preferably, the at least one end of the fiber composite main body is outwardly flared, and wherein the at least one coupling flange comprises a first substantially frustoconical projection, the first frustoconical projection of the at least one coupling flange received within the at least one flared end of the main shaft body.

Providing a flared end of the main shaft body allows for an easy insertion of the coupling flange into the interior of the main shaft body. Such a structure is relatively easily fabricated during curing of a fiber-based shaft.

Preferably, the shaft comprises a plurality of pins extending between the at least one flared end of the man shaft body and the first frustoconical projection of the at least one coupling flange, the plurality of pins retaining the at least one coupling flange within the at least one flared end of the man shaft body.

The use of a series of pins, preferably arranged in a series of parallel rows along the interior of the flared section, allows for the fiber-based main shaft body to be securely coupled to the coupling flange, acting to bolt the coupling flanges securely to the main shaft body.

Preferably, the shaft is arranged such that a portion of fibers at the at least one flared end are wound around the plurality of pins to provide for an equal distribution of forces between the at least one coupling flange and the shaft body, and to improve retention of the pins in the shaft body.

The fibers may be oriented at the flared section to wind around or be intertwined with the pins at the flared section, providing for an improved coupling and retention of the pins within the main shaft body. Alternatively, holes may be formed, e.g., by drilling, in the at least one flared end of said main shaft body, the holes arranged to receive a plurality of pins extending from the first frustoconical projection of the at least one coupling flange into the at least one flared end of the man shaft body.

Preferably, a coupling flange is provided at either end of the main shaft body. Preferably, a first coupling flange is bolted to the rotor hub and a second coupling flange is bolted to the generator system.

Preferably, the drive shaft comprises a composite fiber shaft, wherein substantially all of the fibers are oriented in a parallel winding direction. Preferably, at least 50% to 95% of the fibers are oriented in a parallel winding direction.

As the fibers are oriented in the same direction, the torsional strength will be concentrated in that direction. As in wind turbines the drive shaft will only rotate in one direction, consequently substantially all of the torque will only ever be transferred to the generator in that direction. Accordingly, a more efficient construction of drive shaft can be selected for use.

Preferably, the generator system comprises a permanent magnet generator.

Preferably, the drive shaft is operable to bend as a result of a misalignment between the rotor and the generator system.

A further advantage of the system is presented in situations wherein a misalignment exists between the wind turbine rotor and the generator system, e.g., as a result of faulty construction procedures and/or mounting of wind turbine components. In such a case, the flexible shaft is operable to bend accommodate misalignments in the wind turbine construction.

Preferably, the drive shaft comprises at least one continuous unsupported section, the shaft arranged such that the unsupported section is operable to bend relative to the rotor and the generator system.

An embodiment of the invention will now be described, by way of example only, with reference to the accompanying drawings.

DETAILED DESCRIPTION OF THE INVENTION

Figure 1:
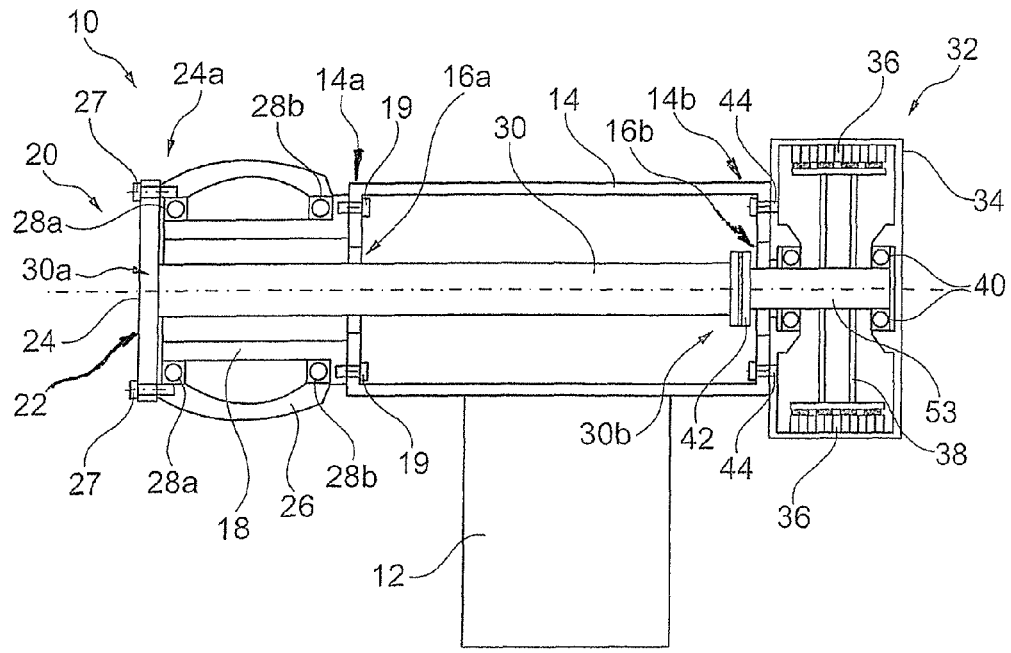
FIG. 1 is a cross-sectional view of a wind turbine according to a first embodiment of the invention.

With reference to FIG. 1, a wind turbine according to a first embodiment of the invention is indicated generally at 10. The wind turbine 10 comprises a tower 12 and a turbine main frame 14, the main frame 14 provided at the upper end of the tower 12 having a windward side 14a and an opposed leeward side 14b. First and second through-going apertures 16a, 16b are defined in the windward side 14a and the opposed leeward side 14b respectively, the apertures 16a, 16b in line with each other, to allow a shaft to extend through the main frame 14 from the windward side 14*a* to the leeward side 14*b*. The main frame 14 is adapted to swivel on top of the tower 12 to correct the yaw angle of the wind turbine 10, so that the turbine is continually facing the wind direction.

A support shaft 18 is provided at the windward side 14*a* of the main frame 14, rigidly mounted to the external surface of the main frame 14. The support shaft 18 comprises a cylindrical tubular body which is positioned about the first aperture 16*a*, concentric to the aperture 16*a*. In FIG. 1, the support shaft 18 is shown as bolted to the main frame 14 using bolts 19, but it will be understood that any suitable attachment method may be used to secure the support shaft 18 to the main frame 14. Preferably, the support shaft 18 is releasably mounted to the main frame 14, to allow for removal of the support shaft 18 from the wind turbine 10, e.g., for servicing and maintenance purposes.

The wind turbine 10 further comprises a rotor, indicated generally at 20, having a plurality of rotor blades (not shown) mounted thereon. The rotor 20 comprises a rotor hub 22 having a front flange 24 and a collar 26 depending from a turbine side 24*a* of the flange 24.

The rotor 20 is provided on the wind turbine 10 by mounting the rotor hub 22 to the support shaft 18. The collar 26 fits about the support shaft 18, with two sets of bearings 28*a*,28*b* provided between the support shaft 18 and the collar 26, the bearings 28*a*,28*b* allowing the rotation of the rotor hub 22 about the support shaft 18. With this construction, the structural load or weight of the rotor 20 is transferred to the structure of the wind turbine 10 from the support shaft 18 to the main frame 14. The rotor hub 22 is directly mounted to the support shaft 18, i.e., there are no vibration damping elements used between the rotor 20 and the support shaft 18.

It will be understood that while two sets of bearings 28*a*, 28*b* are shown in the embodiment of FIG. 1, any suitable number or arrangement of bearings may be used which are operable to support the weight of the rotor 20 while allowing rotation of the rotor hub 22 about the support shaft 18.

While in the rotor hub 22 of FIG. 1, the collar 26 is shown as being bolted to the front flange 24 of the rotor hub 22 using bolts 27, it will be understood that any suitable hub construction may be used, e.g., a single cast-iron structure.

A turbine drive shaft 30 extends from a first end 30*a* rigidly connected to the turbine side 24*a* of the front flange 24, the drive shaft 30 extending through the support shaft 18 into the interior of the main frame 14 towards the opposed leeward side 14*b* of the main frame 14 to a second end 30*b*. The drive shaft 30 is chosen to be mechanically anisotropic, i.e., the shaft has different mechanical properties in different directions. In particular, the drive shaft 30 is chosen to be flexible with regard to bending moments, and high in torsional strength. Due to the wind turbine construction, the drive shaft 30 is only required to transfer torque from the rotor 20 to a generator of the wind turbine—the drive shaft 30 does not carry any of the structural load of the rotor 20. Accordingly, no shaft bearings or rollers are required in the illustrated construction.

Preferably, a composite shaft is used, which is manufactured with the aim of producing a shaft which is flexible in bending while being strong in torsion. Examples of suitable composite shafts include a filament winding-type shaft, a pre-preg fiber shaft (i.e., a "pre-impregnated" composite fiber shaft), a slatted construction-type shaft (wherein the shaft is formed by a plurality of slats arranged in, for example, a longitudinal or helical manner, the slats forming a tubular shaft, adjacent slats coupled to one another using a suitable flexible adhesive).

As the drive shaft 30 is flexible to bending moments, this allows the shaft 30 to substantially prevent the transmission of any bending forces from the rotor 20 to any generator components (for example, as a result of misaligned or moving shaft ends), consequently reducing the wear-and-tear of such components.

The wind turbine 10 further comprises a generator indicated generally at 32 provided at the leeward side 14*b* of the main frame 14. The generator 32 comprises a generator housing 34, a generator stator 36 affixed to the housing 34, and a generator rotor 38 provided in the housing 34. The generator rotor 38 is mounted to an extension 53 of the drive shaft 30. This extended shaft 53 is supported via bearings 40 in the generator housing 34, such that the generator rotor 38 is operable to rotate within the housing 34. Rotation of the generator rotor 38 relative to the generator stator 36 results in the generation of electrical power in the generator 32. It will be understood that the wind turbine 10 may comprise any suitable connection mechanism coupled with the generator 32 such that the generated power may be transmitted to the power grid.

Other generator configurations can be foreseen, for example, the drive shaft 30 may extend through the main frame 14 past the leeward side 14*b* of the main frame 14. In such a construction, the generator rotor 38 may be directly mounted to the drive shaft 30.

The generator 32 is provided at the leeward side 14*b* of the main frame 14, the generator 32 further comprising a generator coupling 42 connected to the generator rotor 38, the generator coupling 42 extending into the interior of the main frame via the second aperture 16*b*. The second end 30*b* of the drive shaft 30 is connected to the generator coupling 42. Accordingly, the drive shaft 30 is directly connected to the generator rotor 38, resulting in a direct-drive machine.

Preferably, the generator 32 is releasably mounted to the wind turbine main frame 14. In FIG. 1, the generator housing 34 is coupled to the leeward side 14*b* of the main frame 14 using bolts 44. It will be understood that any suitable coupling may be used to secure the generator 32 to the main frame 14.

As the rotor support construction of the wind turbine 10 means that the structural load of the rotor 20 is supported by the main frame 14 and tower 12 of the turbine 10 itself, and as the drive shaft 30 is flexible enough to substantially prevent the transmission of bending moments from the rotor hub 22 to the generator 32, accordingly there are substantially no reaction forces acting on the generator 32 apart from the torque transmitted by the drive shaft 30. The absence of reaction forces removes the need for the generator 32 to be load-balanced when installed in the turbine 10, and accordingly the generator 32 can be rigidly mounted to the main frame 14, i.e., without requiring the use of vibration damping elements.

As no vibration damping elements are used in the construction, therefore damper failure is no longer an issue in turbine design, and the performance of turbine components can be more accurately modeled at the design stage. The effects of wear-and-tear can be better predicted for the turbine components, and as a result, more reliable, more efficient and better modeled components can be employed at those locations subject to the most stresses and strains, e.g., hub rotor bearings 28*a*, 28*b*, generator bearings 40.

As the generator 32 is not subject to substantial reaction forces, the reliability of the generator 32 is increased as a constant air gap can be reliably maintained between the generator stator 36 and the generator rotor 38. Furthermore, as the generator 32 does not have to be load-balanced with regard to the forces due to the structural load of the rotor 20, the installation operation of a generator 32 in the turbine 10 is made substantially easier. Accordingly, preferably the generator 32 is provided as a single modular construction, which is easily mounted to the wind turbine main frame 14. This provides for easier installation and removal of a generator 32 to the wind turbine 10 without a relatively complicated load-balancing operation, and the replacement of an existing generator 32 with a new generator (e.g., for upgrade purposes) is made considerably more straightforward, and results in reduced down-time for the wind turbine 10 overall.

Similarly, the rotor 20 may also be provided as a singular modular construction, which can be relatively easily decoupled from the wind turbine main frame 14 for servicing and/or replacement.

Figure 2:
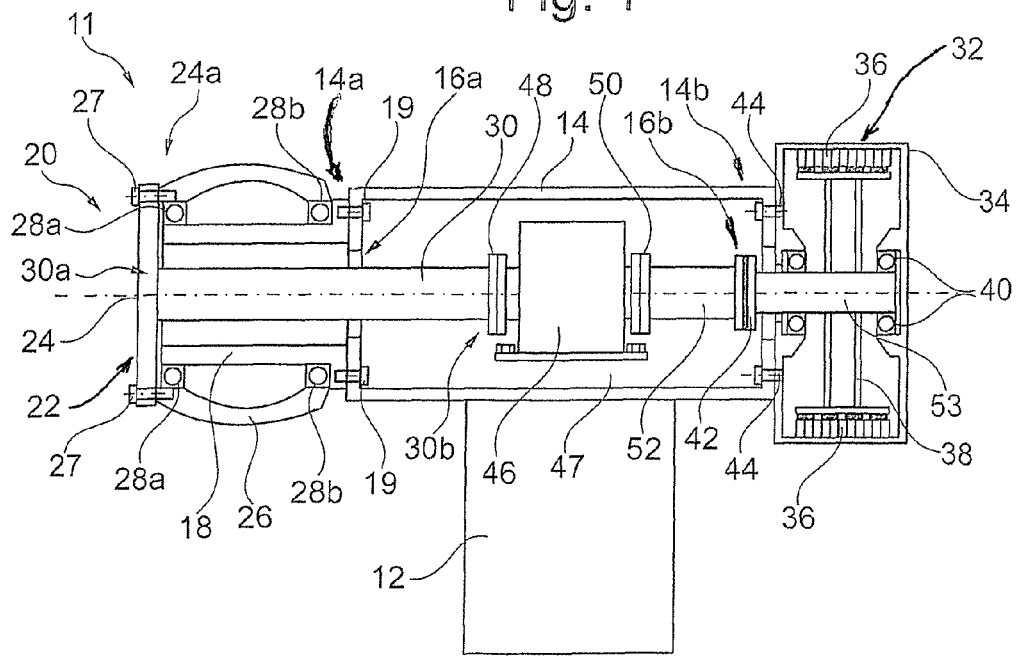
FIG. 2 is a cross-sectional view of a wind turbine according to a second embodiment of the invention.

With reference to FIG. 2, a second embodiment of a wind turbine according to the invention is indicated generally at 11. For the sake of brevity, components similar to those described in the first embodiment are indicated using the same reference numerals, and the relevant sections of the above description can apply to the embodiment of FIG. 2.

In the embodiment of FIG. 2, the wind turbine 11 further comprises a gearbox 46 having an input coupling 48 and an output coupling 50, the gearbox 46 rigidly mounted to the main frame 14 via base 47. The drive shaft 30 is directly connected to the gearbox 46 using input coupling 48, while the gearbox 46 is coupled to the generator 32 using a secondary shaft 52, the secondary shaft 52 extending between a gearbox output coupling 50 and the generator coupling 42. It will be understood that the secondary shaft 52 may be flexible in bending moments similar to the drive shaft 30, to prevent the transmission of any bending moments between the gearbox 46 and the generator 32.

Similar to the generator 32 as described in the first embodiment, as the drive shaft 30 is adapted to prevent transmission of bending moments from the rotor hub 22 to the gearbox 46, the gearbox does not have to be load-balanced with respect to the rotor hub 22. Accordingly, the gearbox 46 can be rigidly mounted to the main frame 14. Preferably, the gearbox 46 is releasably mounted to the main frame 14, allowing for relatively easy removal of the gearbox 46 from the wind turbine 11 for servicing and/or replacement.

The main frame 14 of FIGS. 1 & 2 is shown as a substantially enclosed structure, but it will be understood that other suitable constructions may be employed, e.g., an open-sided cradle construction, allowing relatively easy access to the contained components.

It will be understood that while the drive shaft 30 is shown as a hollow tubular construction any suitable shaft type may be used. The thickness of the wall of the drive shaft 30 preferably may be selected as less than 10 mm, 20 mm, 30 mm, 40 mm, etc. up to 400 mm thickness. It will further be understood that the drive shaft 30 may comprise any suitable nanocomposite material, e.g., nano clay, carbon nanotubes, nano silica etc. Preferably, the drive shaft 30 comprises an electrically insulating material—this would prevent the transmission of high levels electricity to components of the wind turbine which may be experienced in the event of a lightning strike. It will be understood that the drive shaft 30 may be chosen of any suitable length, e.g., more than 0.1 m, 1 m, 3 m, 5 m, 7 m, 9 m, 11 m, etc. in length.

It will be understood that the present invention is suitable for use in any suitable wind turbine construction, e.g., turbines having a maximum power rating of above 2 MW, 3 MW, 4 MW, up to and above 35 MW, etc. Preferably, the system is used in variable speed turbines.

Figure 3:
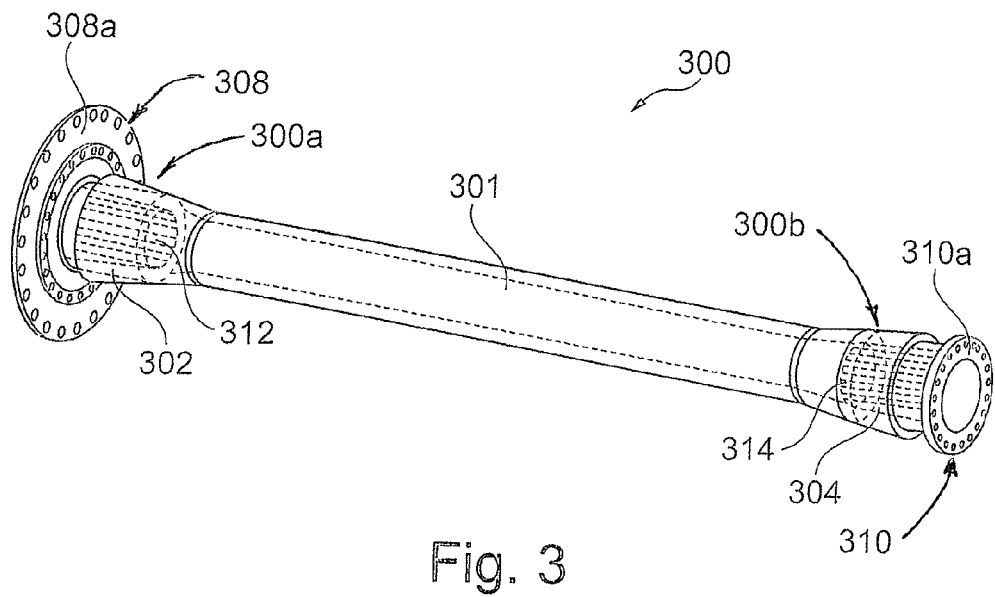
FIG. 3 is a perspective view of a drive shaft coupling mechanism for use in an embodiment of the invention.
Figure 4:
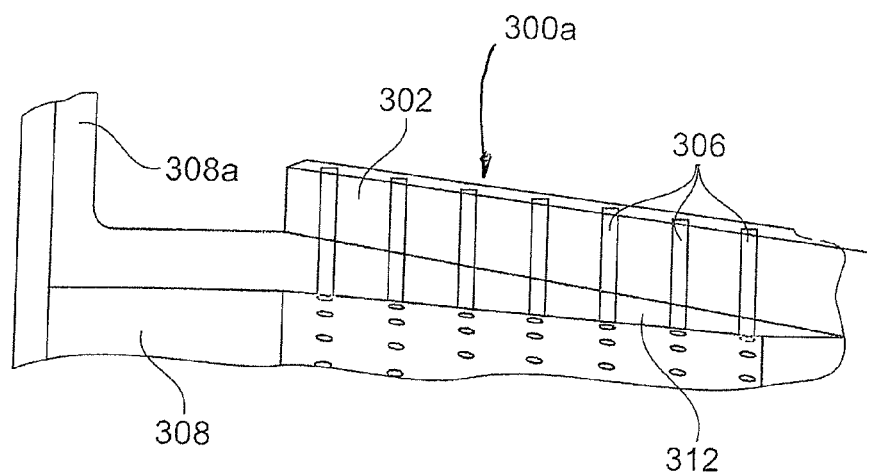
FIG. 4 is an enlarged cross-sectional view of the drive shaft coupling mechanism of FIG. 3.

With reference to FIGS. 3 & 4, a sample drive shaft coupling method according to an embodiment of the invention is illustrated for a sample drive shaft 300.

The drive shaft 300 comprises a substantially cylindrical hollow body 301 having a first end 300a and a second end 300b. The first and second ends 300a, 300b are flared outwardly from the centerline of the shaft, providing flared sections 302,304 of increasing diameter located respectively at the first and second ends 300a,300b.

The drive shaft 300 further comprises first and second coupling flanges 308,310. The first coupling flange 308 is provided at the first end 300a of the shaft 300, and the second coupling flange 310 is provided at the second end 300b of the shaft 300. The first and second coupling flanges 308,310 comprise circular bolting collars 308a,310a which may be bolted to suitable wind turbine components, e.g., a wind turbine rotor hub, a generator rotor, a gearbox for connection to a generator system, etc.

The first and second coupling flanges 308, 310 further comprise first and second frustoconical projections 312, 314 (seen in outline in FIG. 3) provided respectively on the first and second flanges 308, 310. The frustoconical projections 312, 314 are received within the respective first and second flared sections 302, 304 of the shaft body 301. A series of apertures are defined on the first and second frustoconical projections 312, 314, the apertures arranged to receive a series of pins 306. The pins 306 project from the surface of the frustoconical projections 312, 314 away from the central axis of the shaft 300, and are received within the shaft body 301 at the flared sections 302, 304. (This arrangement can be seen in more detail in the enlarged cross-sectional view of FIG. 4, which shows a portion of the first frustoconical projection 312 received within the first flared section 302.)

In a preferred embodiment, the main shaft body 301 is formed from a fiber-based material, with the first and second coupling flanges 308,310 formed from a resilient material, e.g., a metal such as steel, which is more suitable for bolting to wind turbine components than the fiber-based main shaft body 301. In a first embodiment, the fiber-based main shaft may be constructed as a standard shaft body, having flared ends corresponding to flared sections 302,304. Holes are then formed in the flared ends, corresponding to the apertures provided on the frustocontical projections of the coupling flanges, e.g., by drilling holes in the flared ends of the shaft body. The series of pins may then be inserted in the holes in the flared ends to extend through to the apertures in the coupling flanges, to secure the coupling flanges to the main shaft body.

In a preferred construction of such a fiber-based main shaft, the main body 301 of the shaft is processed as a standard fiber-wound construction, with the coupling flanges 308, 310 provided with the series of pins 306 projecting from the surface of the frustoconical projections 312, 314, positioned at either end of the projected shaft body. When the fibers being currently wound to form the shaft body 301 reach one of the ends 300a, 300b of the shaft body and the particular coupling flange 308, 310 to be positioned at the end, the current fibers are applied to the surface of the frustoconical projection 312, 314 of the flange 308,310 in question, with a plurality of the fibers wound around or intertwined with the pins 306 on the surface of the projection 312, 314, in order to provide for an equal distribution of forces from the coupling flanges to the shaft body, to improve the retention of the pins 306 within the shaft 300, and to improve the coupling between the shaft body 301 and the coupling flanges 308, 310. This embodiment of winding the fibers around the pins is also preferred as it prevents damage to the fibers of the shaft which may be caused by drilling holes in the flared sections of the shaft body.

The drive shaft 30, 300 may be manufactured using any suitable manufacturing method or technique, e.g., Vacuum Assisted Resin Transfer Molding (VARTM), hand lay-up, injection molding, Resin Transfer Molding (RTM), spray lay-up, etc.

One particular method of construction may be employed in order to manufacture a composite fiber shaft having a majority of fibers lying in the same direction, namely utilizing fibers applied to a rotating mandrel to form a hollow shaft. In such a system, a mandrel is rotating in a particular direction (e.g., clockwise), while a jig running adjacent the mandrel and along the length of the mandrel applies fibers to the surface of the rotating mandrel, the fibers being applied at an angle to the centerline of the mandrel (e.g., 45° to the normal). The jig runs back-and-forth along the length of the mandrel, resulting in successive layers of fibers building up on the mandrel, resulting in a cross-hatch style arrangement of fibers along the body of the mandrel. The fibers are treated in position to form a hollow shaft.

It will be foreseen that the drive shaft 30, 300 may be of any suitable construction, for example, a hollow composite shaft having a thin-walled steel inner tube. The presence of the steel inner tube helps to prevent delamination and buckling of the shaft.

In the proposed new method of manufacture, during the fiber application stage, the jig applies a first layer of fibers at a first angle $\alpha$ to the normal. After the jig reaches the end of the mandrel on the first pass, the direction of rotation of the mandrel is reversed (e.g., the rotation direction of the mandrel changes from clockwise to anti-clockwise), and the jig turns and travels in the reverse direction along the body of the mandrel. This results in the second layer of fibers being applied substantially in the same direction as the fibers of the first layer, at an angle $\alpha$ to the normal, as opposed to the cross-hatch application of successive fiber layers provided by the known approach.

It will be understood that the fibers may be applied as successive layers of fiber-based material, wherein successive layers have a relative adhesive attraction to each other and to the underlying mandrel. Such a relative adhesion is sufficient to temporarily hold the fiber layers in position during application to the mandrel, such that the applied layers will not unwind from the mandrel as the direction of rotation of the mandrel is reversed.

As soon as the jig returns to the start of the mandrel, it turns and resumes in a forward direction along the mandrel, and the direction of rotation of the mandrel is restored to the original direction (e.g., returning to clockwise rotation). The action of reversing the direction of rotation of the mandrel may be accomplished simply by reversing the polarity of the motor rotating the mandrel once the jig reaches the end of the mandrel.

This procedure can be repeated for as many passes of the jig along the mandrel as required, and consequently for as many layers of fibers as required. As a result, the fibers applied from the jig to the mandrel will all be lying in substantially the same direction along the body of the mandrel, at substantially the same angle $\alpha$ to the normal.

A shaft formed having such fibers in parallel alignment will have a high torsional strength in one direction. As the drive shaft of a wind turbine is mainly in general only required to transmit torque in one direction, this results in a drive shaft for a wind turbine having a greater torsional strength for same amount of fibers used in the construction of the shaft, and consequently lower weight shafts may be produced having the same torque rating as currently-used standard shafts.

Preferably, the drive shaft would comprise a composite fiber shaft having a majority of fibers lying in the same direction along the body of the shaft, preferably at least 50 to 95% of fibers.

It will be understood that the generator 32 used in the design may be a permanent magnet generator (PMG), a synchronous generator, an asynchronous generator, a doubly-fed generator, etc.

The drive shaft 30, 300 may be selected to have a maximum torsion capability, in that the shaft may break if the torsion acting on the shaft exceeds a defined level. This acts to protect the components of the generator 32 and/or gearbox 46 from any damage that might be incurred in the event of a sudden large increase in torque, e.g., a sudden gale force wind acting on the turbine rotor.

The drive shaft 30, 300 may also be configured to be rated for a certain torsional vibration frequency, and to dampen and torsional vibrations above such a frequency. The ability to dampen high-frequency torsional vibrations allows for the system to reduce the effect of cocking or cogging torque. Cogging torque of electrical motors is the torque due to the interaction between the permanent magnets of the rotor and the stator slots of a Permanent Magnet (PM) machine, and can result in high-frequency "jerky" torque. As the drive shaft 30, 300 can dampen these high-frequency torsional vibrations, it prevents the transmission of this "jerkiness" to the rotor 20 and the turbine blades, which would normally result in acoustic noise emission from the turbine.

It will be understood that the use of the term "rigidly mounted" means that the components are mounted without damping elements, It will be understood that the use of the term "rigidly connected" means that components are directly connected or mounted together, e.g., without damping elements and/or without relative motion between the connected components.

As the shaft used is flexible to absorb the transmission of vibrations between the rotor and the generator system, such rigid mounting and connecting of components can be accomplished, eliminating the need for vibration damping elements in the wind turbine construction.

The above describes a wind turbine construction which is of reduced weight, improved reliability, and can easily be serviced and upgraded. The invention is not limited to the embodiments described herein, and may be modified or adapted without departing from the scope of the present invention.

What is claimed is:

1. A horizontal-axis wind turbine having a rotor with a diameter of at least 50 m length, the turbine comprising:
    a wind turbine main frame;
    a generator system comprising a generator that is rigidly mounted to said main frame without vibration damping elements;
    a rotor hub, said hub mounted to a rigid support shaft provided on said main frame, wherein said hub is operable to rotate about said support shaft and wherein said support shaft transfers structural loading of said hub to said main frame; and
    a drive shaft rigidly connected to and extending from said hub, wherein said drive shaft is connected to said generator system to transfer torque from said hub to said generator system, wherein said drive shaft is a mechanically anisotropic shaft that has sufficient flexibility for preventing transmission of bending moments from the hub to the generator system by absorption of the bending moments;

wherein the drive shaft comprises a first coupling flange at is first end and a second coupling flange at an opposite end, the first coupling flange being bolted to said rotor hub and the second coupling flange being bolted to said generator system;

wherein the drive shaft is only supported at said first and second coupling flanges by said hub and said generator system, the drive shaft being free of shaft bearings and rollers at locations between the first and second ends.

2. The wind turbine of claim 1, wherein said drive shaft is a composite material shaft.

3. The wind turbine of claim 2, wherein said drive shaft is selected from one of the following: a filament wound shaft, a pre-preg fiber composite shaft, a slatted-construction shaft.

4. The wind turbine of claim 1, wherein said generator system comprises a gearbox coupled to a generator, said gearbox rigidly mounted to said main frame, wherein said drive shaft is directly connected to said gearbox to drive said generator.

5. The wind turbine of claim 4, wherein said generator is rigidly mounted to said main frame.

6. The wind turbine of claim 1, wherein the rigid support shaft extends through the rotor hub and is connected to the hub at a most distal end of the hub, and wherein bearings are provided between an outer end of the rigid support shaft and an inner side of the hub.

7. The wind turbine of claim 1, wherein said rigid support shaft is provided at a first end of said main frame, and wherein said generator system is releasably mounted to a second opposed end of said main frame.

8. The wind turbine of claim 7, wherein said generator system is releasably mounted to an exterior surface of said main frame.

9. The wind turbine of claim 7, wherein said rigid support shaft is releasably mounted to said first end of said main frame.

10. The wind turbine of claim 1, wherein the wind turbine comprises at least two sets of hub bearings provided at said support shaft, said hub mounted to said sets of hub bearings.

11. The wind turbine of claim 1, wherein said drive shaft is directly connected between said hub and said generator system.

12. The wind turbine of claim 1, wherein said drive shaft comprises a fiber composite main shaft body and.

13. The wind turbine of claim 12, wherein said at least one end of said fiber composite main shaft body is outwardly flared, and wherein at least one of said coupling flanges comprises a first substantially frustoconical projection, said first substantially frustoconical projection being received within said at least one outwardly flared end of said main shaft body.

14. The wind turbine of claim 13, wherein said drive shaft comprises a plurality of pins extending between said at least one flared end of said main shaft body and said first frustoconical projection of said at least one coupling flange, said plurality of pins retaining said at least one coupling flange within said at least one flared end of said main shaft body.

15. The wind turbine of claim 14, wherein the drive shaft is arranged such that a portion of fibers at said at least one flared end are wound around said plurality of pins to provide for an equal distribution of forces between said at least one coupling flange and said main shaft body, and to improve the retention of said pins in the main shaft body.

16. A horizontal-axis wind turbine having a rotor with a diameter of at least 50 m length, the turbine comprising:
a wind turbine main frame;
a generator system at least a portion of which is rigidly mounted to said main frame;
a rotor hub, said hub mounted to a rigid support shaft provided on said main frame, wherein said hub is operable to rotate about said support shaft and wherein said support shaft transfers structural loading of said hub to said main frame; and
a drive shaft rigidly connected to and extending from said hub, wherein said drive shaft is connected to said generator system to transfer torque from said hub to said generator system,
wherein said drive shaft is a mechanically anisotropic shaft adapted to limit the bending moments transferred between said hub and said generator system,
wherein said shaft comprises a fiber composite main shaft body and at least one coupling flange formed from a rigid material suitable for bolting, said at least one coupling flange being arranged to couple with at least one end of said main shaft body,
wherein said at least one end of said fiber composite main shaft body is outwardly flared, and wherein said at least one coupling flange comprises a first substantially frustoconical projection, said first substantially frustoconical projection of said at least one coupling flange being received within said at least one outwardly flared end of said main shaft body.

* * * * *